(12) United States Patent
Schoch

(10) Patent No.: US 6,356,124 B1
(45) Date of Patent: Mar. 12, 2002

(54) METHOD AND APPARATUS FOR GENERATING A DIGITAL SINE WAVE SIGNAL

(75) Inventor: Daniel Schoch, Costa Mesa, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/603,042

(22) Filed: Jun. 26, 2000

(51) Int. Cl.[7] .............................................. H03B 21/00
(52) U.S. Cl. ...................................... 327/129; 327/106
(58) Field of Search ................................ 327/105, 106, 327/107, 129; 708/271, 272, 290

(56) References Cited

U.S. PATENT DOCUMENTS 5,016,259 A * 5/1991 Hershberger ................. 375/62
5,936,438 A * 8/1999 Whikehart et al. .......... 327/106
6,121,816 A * 9/2000 Tonks et al. ................. 327/296

* cited by examiner

Primary Examiner—Tuan T. Lam
(74) Attorney, Agent, or Firm—Foley & Lardner

(57) ABSTRACT

A signal generator is disclosed. The signal generator includes a variable frequency selector that is configured to provide a variable frequency for generation of a variable frequency signal. The signal generator also includes a periodic signal generator. The periodic signal generator is used to generate a periodic signal. The periodic signal generator has an input receiving the variable frequency signal and an output providing the periodic signal. The periodic signal has a frequency approximately the same as the variable frequency selection. The periodic signal generator stores a table of values associated with a reference periodic signal, each stored value corresponding to a discrete time in the reference periodic signal. The periodic signal generator is configured to interpolate between the discrete points in the table of derivative values.

20 Claims, 1 Drawing Sheet

METHOD AND APPARATUS FOR GENERATING A DIGITAL SINE WAVE SIGNAL

FIELD OF THE INVENTION

The disclosure relates to a method and an apparatus for generating digital sine wave signals. In particular, the systems disclosed and described relate to simplified systems for generating variable frequency sine wave signals for use in communications applications.

BACKGROUND OF THE INVENTION

Many electronic applications and systems require the use of sinusoidal signal generators that may be digitally sampled. Often, such sinusoidal signal generators are used in communications applications, such as for use in mixing or tone generation. Further, other varied uses of sinusoidal signal generators exist.

Many electronic applications require that the frequency of the sinusoidal signal being generated is selectively variable. As depicted in FIG. 1, selectively variable frequency sinusoidal signals may be generated using a system such as system 10 that includes a look-up table 12 having a frequency input 14 to provide a waveform output 16. The frequency input provides a clock signal at the desired frequency and look-up table 12 is used to retrieve a memorized sample of the frequency associated sinusoid from a look-up table or data table. The data table may be stored on any type of storage device, commonly in a read only memory (ROM) stored table. Because it may be impractical to store sinusoid samples from a large number of frequencies, the frequency accuracy and distortion performance may be poor. Such performance may be improved by storing large amounts of samples, which translates into substantial amounts of chip real estate, that is used up by ROM.

Referring now to FIG. 2, a system for providing a sinusoidal waveform output 20 is depicted. System 20 includes a selective frequency input 22, a look-up table 24, an interpolation mechanism 26, and a waveform output 28. Similar to system 10, frequency input 22 supplies a clock signal to look-up table 24. Look-up table 24 retrieves stored samples of sinusoidal signals from a data table. The data table may be stored in any of a variety of storage devices, most commonly ROM. Because sample values at each clock tick of a desired frequency may not be available in the data table, an interpolation mechanism 26 interpolates sample values between points that are not included in the data table. Because, the look-up table requires numerous sample values and the interpolation mechanism requires a plurality of calculations, the complexity of system 20 is undesirable. Further, system 20 requires a set of sample values and derivative values in the data table for each of a plurality of frequencies.

Referring now to FIG. 3, a system 30 for generating a selective frequency sinusoidal signal is depicted. System 30 includes a selective frequency input 32, a recursive calculations device 34, and a waveform output 36. A selective frequency input is applied to the recursive calculations device. The recursive calculations device uses a pair of difference equations as its staring point, therefore some initial conditions must be input to the recursive calculations. Because system 30 does not use a look-up table, no ROM is required and therefore, may be seen as the smallest implementation in respect to die area (i.e. the area required on an integrated circuit device or other electronic device layout). However, recursive system 30 is very sensitive to initial conditions and requires calculations to be carried out with large numbers of decimal places, to provide appropriate accuracy. The algorithm complexity is usually far beyond an easy hardware implementation and typically requires a microprocessor or a digital signal processing (DSP) device including a floating point array. The recursive system 30 however is capable of providing accurate frequency setting and performance.

Accordingly, there is a need for an alternative method and apparatus for generating sinusoidal signals. There is a need for a method and apparatus for generating accurate sinusoidal signals in a wide frequency band that may be fit into a relatively small die area. Further, there is a need for a method and system for generating sinusoidal signals that may be used in communication systems and devices which maintain relatively good accuracy and require few and simple computations.

SUMMARY OF THE INVENTION

An exemplary embodiment relates to a signal generator. The signal generator includes a variable frequency selector. The variable frequency signal is configured to provide a variable frequency signal. The signal generator also includes a periodic signal generator. The periodic signal generator is configured to generate a periodic signal. The periodic signal generator has an input receiving the variable frequency selection and an output providing the periodic signal. The periodic signal has a frequency approximately the same as the variable frequency selection. The periodic signal generator is configured to store a table of derivative values associated with a reference periodic signal, each stored derivative value corresponding to a discrete time in the reference periodic signal. The periodic signal generator is configured to interpolate between the discrete points in the table of derivative values.

Another exemplary embodiment relates to a periodic signal generator. The periodic signal generator includes a programmable clock divider having a frequency select input and a master clock frequency input. The programmable clock divider has an output providing a clock frequency signal. The periodic signal generator also includes a periodic function generator. The periodic function generator has an input receiving the clock frequency signal, and the periodic function generator has an output providing a periodic function signal having a frequency substantially the same as the frequency of the clock frequency signal. The periodic function generator stores a data table of rate of change values associated with a reference periodic function. Each stored rate of change value corresponds to a discrete time in the reference periodic signal. The periodic function generator is configured to interpolate between the discrete points in the data table.

Yet another exemplary embodiment relates to a method of generating a periodic signal having a selectively variable frequency. The method includes receiving a frequency select signal by a variable frequency clock. The method also includes receiving a master clock signal by the variable frequency clock. Further, the method includes providing a selected frequency signal by the variable frequency clock, to a periodic function generator configured to generate a periodic signal of variable frequency. Further still, the method includes retrieving a rate of change value from a stored data table of rate of change values associated with the periodic signal. Yet further still, the method includes calculating a new value of the periodic signal using an interpolation based on the retrieved rate of change value from the data table of values.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

A practical implementation of digital sine wave signal generators is in the application of dual-tone multi-frequency (DTMF) signaling schemes. DTMF signaling schemes are used today in conventional tone dialing telephones. In order to generate the plurality of tones required, at least one, or a plurality of digital sine wave signal generators may be used to generate the applicable tones. However, as communication devices are becoming ever increasing miniaturized, compact electronic design is becoming increasingly important. Therefore, to preserve valuable chip space, it is desirable to include variable frequency digital sine wave signal generators that do not require a large amount of memory, or processing capabilities.

Figure 1:
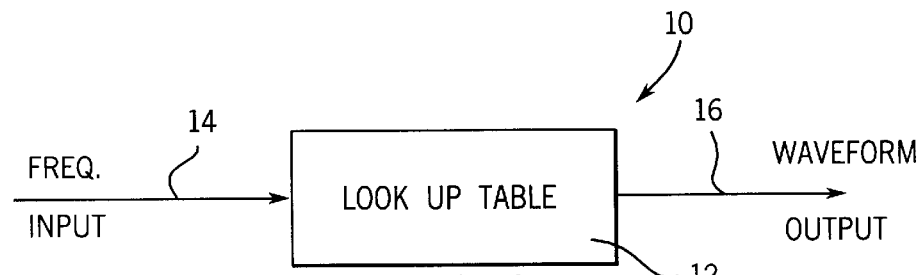
FIG. 1 is a block diagram of a first prior art waveform generator.
Figure 2:
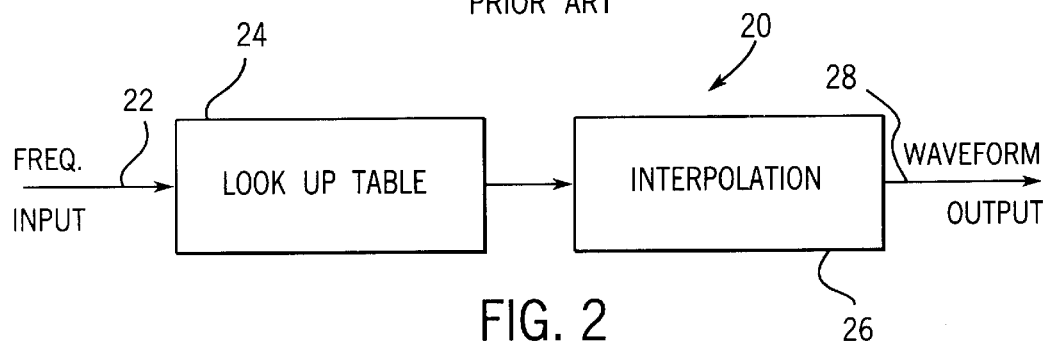
FIG. 2 is a block diagram of a second prior art waveform generator.
Figure 3:
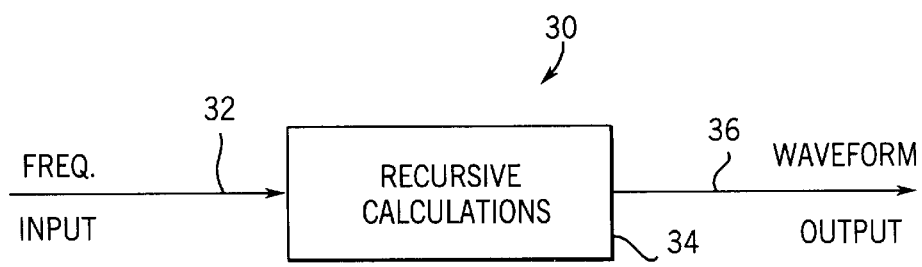
FIG. 3 is a block diagram of a third prior art waveform generator.
Figure 4:
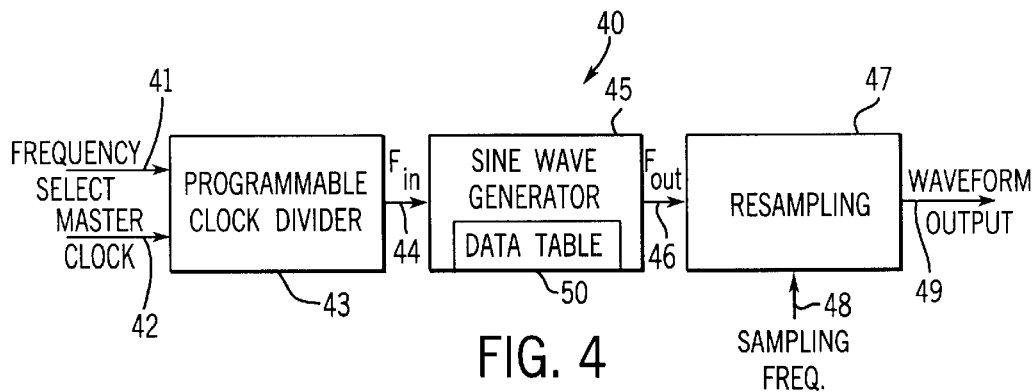
FIG. 4 is an exemplary block diagram of a sinusoidal waveform generator.

Referring now to FIG. 4, a variable frequency digital sine wave signal generator 40 is depicted. Digital signal sine wave signal generator 40 includes a frequency select input 41, a master clock input 42 provided to a programmable clock divider 43. Programmable clock divider 43 outputs a frequency input 44 to a sine wave generator 45. Sine wave generator 45 provides a sine wave frequency output 46 to a resampling mechanism 47 that receives a sampling frequency 48. Resampling mechanism 47 outputs a digital sine wave 49.

Programmable clock divider 43 generates an output clock frequency signal according to the selected frequency 41 based on the master clock signal 42. In an exemplary embodiment, the frequency input signal 44 is a clock signal having the desired frequency select frequency. Further, in an exemplary embodiment, programmable clock divider 43 generates an output clock frequency in the range of 8 Khz to 2048 Khz with a step size of 250 Hz. However, the programmable clock divider is not restricted or limited to frequencies in that given frequency range or with the provided step size. Any applicable frequency ranges and step sizes may be used depending on the application for which system 40 will be used. The output clock frequency signal is generated by computing the following equation $$f_{in} = \frac{\text{frequency\_select}}{2^{13}} \cdot \text{master\_clock} \qquad (1)$$

The exemplary implementation described by equation (1) above requires a thirteen bit accumulator. However, any size accumulator may be used depending on the desired step size.

Programmable clock divider 43 outputs a selected frequency clock signal 44 and provides the selected frequency clock signal to sine wave generator 45. Sine wave generator 45 uses, in an exemplary embodiment a ROM data table 50 to store nine derivatives (or rates of change) of half a sine wave (a reference periodic signal) and does not store any direct sample values. In alternative embodiments, the data table including derivative information of the sine wave, may be stored on any of a variety of storage devices, including, but not limited to hard disk, random access memory, programmable random access memory (PRAM), erasable programmable random access memory (EPROM), optical media, and the like. Further, any number of derivatives may be stored, depending on the desired accuracy. The stored values of the derivatives are, in an exemplary embodiment, computed as follows:

$$\text{stored\_value}(x) = \frac{d}{dx}\sin\left(\frac{2\pi}{18} \cdot x\right), \qquad (2)$$

for $0 \leq x \leq 9$ where x is an integer.

Sine wave generator 45 utilizes a simple accumulator to interpolate 23 points between stored samples. Sine wave generator 45 does not require stored samples of sine waves in the associated data table 50. In an exemplary embodiment, the derivatives are only five bits wide, and sine wave generator 45 is able to achieve a signal to noise ratio of better than 42 decibels (dB) with twelve bit output. The output frequency signal $f_{out}$ is provided by the following:

$$f_{out} = \frac{f_{in}}{\text{points\_per\_period}}. \qquad (3)$$

In this exemplary embodiment, the total points per sine are given by $$\text{points\_per\_period} = 18 \cdot 23 = 414 \qquad (4)$$

Further, in an exemplary embodiment, the output of sine wave generator 46 may be resampled at the desired sampling frequency 48 by resampling mechanism 47 to provide a digital sine wave signal. In the case of code division multiple access (CDMA) applications, the desired exemplary sampling frequency may be 8 KHz.

In alternative embodiments, the resultant sine wave generated may be made arbitrarily frequency accurate by increasing the clock divider register size (as described with respect to equation (1)). Further, system 40 is able to deliver performance over a wide frequency band because it uses both a ROM table look-up in connection with an interpolation mechanism and further because the ROM table look-up utilizes only sine wave derivative information. Thus, system 40 requires very little ROM space to store derivatives which may be utilized across a large frequency band. Further still, system 40 utilizes algorithms that have very small complexity, in an exemplary embodiment only two accumulators and a very small ROM are required.

While the preferred embodiment refers to communications applications, the embodiments described may also be applied to a plurality of electrical devices, including, other types of tone generation and communications devices. Further, while the exemplary embodiment refers to sine wave signal generation, this phrase is to be interpreted broadly. The embodiment may encompass those situations in which any of a variety of periodic functions are to be generated (such as square waves, triangular waves, and the like) are to be generated.

Further still, those who have skill in the art will recognize that the disclosed embodiments are applicable with many different hardware configurations, software architectures, communications protocols, and organizations, or processes.

While the detailed drawings, specific examples, and particular formulations given describe exemplary embodiments, they serve the purpose of illustration only. The materials and configurations shown and described may differ depending on the chosen performance characteristics and physical characteristics of the electronics devices. For example, the type of electronic device or hardware architecture used may differ. The systems and methods shown and described are not limited to the precise details and conditions disclosed. Furthermore, other substitutions, modifications, changes, and omissions may be made in the design, operating conditions and arrangement of the preferred embodiments without department from the spirit of the invention as express in the appended claims.

What is claimed is:

1. A signal generator, comprising:

a variable frequency selector, configured to provide a variable frequency signal; and a periodic signal generator, configured to generate a periodic signal, the periodic signal generator having an input receiving the variable frequency signal and an output providing the periodic signal, the periodic signal having a frequency approximately the same as the variable frequency signal, the periodic signal generator configured to store a table of derivative values associated with a reference periodic signal, each stored derivative value corresponding to a discrete time in the reference periodic signal, the periodic signal generator configured to interpolate between the discrete times in the table of derivative values.

2. The signal generator of claim 1, wherein the variable frequency selector is a programmable clock divider.

3. The signal generator of claim 1, wherein the periodic signal generator is a sine wave generator.

4. The signal generator of claim 1, wherein the periodic signal generator calculates a new signal value based on the table value.

5. The signal generator of claim 1, wherein the variable frequency signal has the range of at least 8 KHz to 2048 KHz.

6. The signal generator of claim 1, further comprising:

a sampling system configured to sample the generated periodic signal.

7. A periodic signal generator, comprising:

a programmable clock divider having a frequency select input and a master clock frequency input, the programmable clock divider having an output providing a clock frequency signal; and a periodic function generator, the periodic function generator having an input receiving the clock frequency signal, and the periodic function generator having an output providing a periodic function signal having a frequency substantially the same as the frequency of the clock frequency signal, the periodic function generator storing a data table of rate of change values associated with a reference periodic function, each stored rate of change value corresponding to a discrete time in the reference periodic signal, the periodic function generator configured to interpolate between the discrete time in the data table.

8. The periodic signal generator of claim 7, wherein the master clock frequency is 2048 KHz.

9. The periodic signal generator of claim 7, wherein the periodic function generation is a selective frequency sine wave generator.

10. The periodic signal generator of claim 7, wherein the data table of rate of change values is representative of instantaneous function derivative values.

11. The periodic signal generator of claim 7, wherein the periodic function generator is configured to interpolate using linear interpolation.

12. The periodic signal generator of claim 7, wherein the master clock frequency input has a frequency of 2048 KHz.

13. The periodic signal generator of claim 7, wherein the periodic signal generator is configured for code division multiple access (CDMA) applications.

14. The periodic signal generator of claim 7, further comprising:

a sampling system configured to sample the generated periodic signal.

15. A method of generating a periodic signal having a selectively variable frequency, comprising:

receiving a frequency select signal by a variable frequency clock;

receiving a master clock signal by the variable frequency clock;

providing a selected frequency signal by the variable frequency clock, to a periodic function generator configured to generate a periodic signal of variable frequency;

retrieving a rate of change value from a stored data table of rate of change values associated with a reference periodic signal; and calculating a new value of the periodic signal using an interpolation based on the retrieved value from the data table of rate of change values.

16. The method of claim 15, wherein the variable frequency clock is a programmable clock divider.

17. The method of claim 15, wherein the data table of rate of change values includes values representative of instantaneous derivatives of the periodic signal.

18. The method of claim 15, wherein the interpolation is a linear interpolation.

19. The method of claim 15, wherein the periodic function generator is a sine wave generator.

20. The method of claim 15, further comprising:

sampling the periodic signal.

* * * * *